United States Patent [19]

Young

[11] Patent Number: 4,697,113
[45] Date of Patent: Sep. 29, 1987

[54] MAGNETICALLY BALANCED AND CENTERED ELECTROMAGNETIC MACHINE AND CRYOGENIC REFRIGERATOR EMPLOYING SAME

[75] Inventor: Niels O. Young, Eagle, Id.

[73] Assignee: Helix Technology Corporation, Waltham, Mass.

[21] Appl. No.: 761,164

[22] Filed: Aug. 1, 1985

[51] Int. Cl.[4] ............................................. H02K 33/00
[52] U.S. Cl. ...................................... 310/15; 310/30; 310/24
[58] Field of Search ..................... 310/15, 30, 24, 34, 310/35; 290/1, 4; 62/6

[56] References Cited

U.S. PATENT DOCUMENTS

| | | | |
|---|---|---|---|
| 3,234,395 | 2/1966 | Colgate | 290/1 |
| 3,247,406 | 4/1966 | Toesca | 290/1 |
| 3,364,361 | 1/1968 | Burger | 290/1 |
| 3,443,111 | 5/1969 | Moupetit et al. | 290/1 |
| 4,349,757 | 9/1982 | Bhate | 310/30 X |
| 4,389,849 | 6/1983 | Beggs et al. | 310/15 X |
| 4,454,426 | 6/1984 | Benson | 310/15 X |
| 4,455,497 | 6/1984 | Shtrikman | 310/30 |
| 4,532,431 | 7/1985 | Iliev et al. | 310/15 X |
| 4,545,209 | 10/1985 | Young . | |
| 4,602,174 | 7/1986 | Redlich | 310/15 |
| 4,623,808 | 11/1986 | Beale | 310/15 |
| 4,631,430 | 12/1986 | Aubrecht | 310/30 X |

OTHER PUBLICATIONS

V. Fireteau, "Reduction of the Transverse Edge Effect in Linear Machines with Honogeneous Secondary Armature by Changing the Air Gap Configuration", *Rev. Roum. Sci. Techn.—Electrotech, et Energ.*, 22, 2, pp. 209-215, Bucarest, 1977.

Primary Examiner—Donovan F. Duggan
Attorney, Agent, or Firm—Hamilton, Brook, Smith & Reynolds

[57] ABSTRACT

A cryogenic refrigerator includes opposing pistons driven by linear electromagnetic machines. Magnetic elements on armatures reciprocate adjacent to first and second flux paths and a transfer of flux between the flux paths with movement of either armature causes the other armature to move in a balanced fashion in an opposite direction. The armatures are driven by coils which transfer the flux from one flux path to the other. Tapers in the flux paths cause the armatures to seek a centered position, or are tailored to minimize compressor input power.

28 Claims, 9 Drawing Figures

MAGNETICALLY BALANCED AND CENTERED ELECTROMAGNETIC MACHINE AND CRYOGENIC REFRIGERATOR EMPLOYING SAME

FIELD OF THE INVENTION

This invention relates to electromagnetic machines and in particular to compressors having opposing pistons. The invention further relates to a cryogenic refrigerator employing such a compressor.

BACKGROUND

A split Stirling refrigeration system is shown in FIG. 1. This system includes a reciprocating compressor 14 and a cold finger 16. Two pistons 17 and 18 of the compressor reciprocate in a cylinder 15 in opposition to each other to provide a nearly sinusoidal pressure variation in a pressurized refrigeration gas such as helium. The pressure variation in a head space 19 is transmitted through a supply line 20 to the cold finger 16.

Within the housing of the cold finger 16 a cylindrical displacer 26 is free to move in a reciprocating motion to change the volumes of a warm space 22 and a cold space 24 within the cold finger. The displacer 26 contains a regenerative heat exchanger 28 comprised of several hundred fine-mesh metal screen discs stacked to form a cylindrical matrix. Other regenerators, such as those with stacked balls, are also known. Helium is free to flow through the regenerator between the warm space 22 and the cold space 24. A piston element 30 extends upwardly from the main body of the displacer 26 into a gas spring volume 32 at the warm end of the cold finger.

The refrigeration system of FIG. 1 can be seen as including three isolated volumes of pressurized gas. A working volume of gas comprises the gas in the head space 19 of the compressor, the gas in the supply line 20, and the gas in the spaces 22 and 24 and in the regenerator 28 of the cold finger 16. A second volume is a relatively large dead space in the compressor behind the compressor pistons 17, 18. It is sealed from the working volume by clearance seals between the pistons 17, 18 and the cylinder 15. The third volume of gas is the gas spring volume 32 which is sealed from the working volume by a clearance seal 34 surrounding the drive piston 30. The three isolated volumes of gas are maintained apart by clearance seals. Such seals are imperfect, and therefore allow for slow leakage between these three volumes of gas. This small leakage is beneficial.

Operation of the split Stirling refrigeration system will now be described. At the point in the cycle shown in FIG. 1, the displacer 26 is at the cold end of the cold finger 16 and the compressor is compressing the gas in the working volume. This compressing movement of the compressor pistons 17, 18 causes the pressure in the working volume to rise from a minimum pressure to a maximum pressure and this warms the working volume of gas. The pressure in the gas spring volume 32 is stabilized at a level between the minimum and maximum pressure levels of the working volume. Thus, at some point the increasing pressure in the working volume creates a sufficient pressure difference across the drive piston 30 to overcome retarding forces including a pressure differential across the displacer. The displacer then moves rapidly upward. With this movement of the displacer, high-pressure working gas at about ambient temperature is forced through the regenerator 28 into the cold space 24. The regenerator absorbs heat from the flowing pressurized gas and thereby reduces the temperature of the gas.

The compressor pistons 17, 18 now begin to move away from each other and to expand the working volume. With expansion, the high pressure helium in the cold space 24 is cooled even further. It is this cooling in the cold space 24 which provides the refrigeration for maintaining a temperature gradient of over 200 degrees Kelvin over the length of the regenerator.

At some point in the expanding movement of the pistons 17, 18, the pressure in the working volume drops sufficiently below that in the gas spring volume 32 for the gas pressure differential across the piston portion 30 to overcome retarding forces. The displacer 26 is then driven downward to the starting position of FIG. 1. The cooled gas in the cold space 24 is thus driven through the regenerator to extract heat from the regenerator. The heat added to the regenerator at an earlier time by high pressure working gas is less than the heat subtracted at this time by low pressure working gas. Therefore, there is net refrigeration on the average.

The traditional approach to drive motor design in split Stirling refrigerators has been to utilize a rotary electric drive in the compressor. Lubricated mechanical bearings and linkages are employed to convert rotary motion to oscillating motion. More recently, systems have been developed using a linear electric drive directly coupled to each compressor piston.

Rotary drive systems have the advantages of being lighter and smaller than linear drive systems for given outputs. Also, the rotary drive system is relatively insensitive to loading due to acceleration of the system because major inertial forces are routed through the mechanical bearings. The mechanical bearings also completely define the piston stroke at any speed. On the other hand, rotary drive systems suffer side loads and torsional vibration which can not be easily eliminated. Furthermore, the rolling element bearings, the need for connecting rods with their potential for backlash and the presence of laminated motor windings in the working gas environment have serious negative effects on acoustic noise, induced vibration and generation of gas and debris in the refrigerator.

Linear drive systems have the advantage of the elimination of all rolling element bearings. A single linear gas bearing per piston results in very low acoustic noise generation. Further, excellent dynamic balancing can be achieved by utilizing matched opposed pistons moving colinearly. With the center of symmetry coincident with the center of gravity of the compressor, the result is a very low level of induced vibration. By carrying mechanical loads through short stiff paths, deflections and stresses due to side forces can be kept to a minimum. Also, motor coil windings may be positioned external to the working gas to eliminate any potential of gas contamination due to outgassing. Furthermore, all parts of the windings in a linear motor contribute to the mechanical output. In rotary motors portions of the windings (end turns) are non-axial and do not contribute to the mechanical output although these non-axial portions do contribute to the ohmic losses and to the leakage reactance. These features of linear drive systems result in a very long life and a highly reliable refrigerator.

A disadvantage of the use of linear motors in cryogenic refrigerators is that accelerations of the refrigerator system may cause the compressor pistons to shift in a common direction and thus cause a loss of balance of the system about a center plane. This result is due to the lack of mechanical linkages which otherwise oppose the shifting of the pistons. Other forces such as the force of gravity can also act to pull the pistons in a common direction. For balanced operation, forces on the two pistons must be equal in magnitude but opposite in direction.

Another problem associated with linear motor drives is that angular acceleration and pressure differentials can cause a shift in the mean position of each piston relative to a center plane.

A way to appreciate these two problems is to consider what controls the end points of the stroke of each piston. One solution to the problems of balancing and centering linear drive motors is to use sophisticated feedback control. The coils to the respective drive motors are energized in a fashion which maintains balance while providing the work necessary to compress the refrigerant. Such control systems add undesirable complexity and power requirements to the electronic control of the system.

DISCLOSURE OF THE INVENTION

In accordance with one aspect of the present invention, an electromagnetic machine comprises a pair of armatures mounted for reciprocal movement toward and away from each other. A stator has parallel magnetic flux paths between the armatures. The flux paths are oriented such that movement of each armature transfers flux between the flux paths. Movement of one armature, not balanced by movement of the other armature in the opposite direction, causes balancing forces on the other armature. Due to the parallel magnetic flux paths, the armatures behave as if they were mechanically linked together. When one moves outward, magnetic flux is transferred so that the other receives magnetic forces making it also move outward. The armatures, therefore, behave as if mechanically linked by a "springy" set of levers.

In a preferred application of the invention to a dual opposed piston compressor, radially polarized magnetic elements are polarized oppositely to each other. Portions of each of two flux paths surround each magnet and a gap is provided between the flux paths adjacent to each magnet. An electromagnetic coil or coils surround the first flux path and are surrounded by a substantial portion of the second flux path. A flux return between the two magnets is provided within the annulus. Non-opposed axial movement of either magnet transfers magnetic flux between the flux paths to cause a nonuniform flux density adjacent to each magnet which applies balancing forces on the magnets. Electric current through the coil or coils causes a transfer of flux which applies forces in opposite directions on the magnets. For consistent balancing throughout the stroke of each piston element, the magnets should be continuous along an axial length which is greater than the stroke length and be adjacent to the gap between the two flux paths throughout the stroke. Preferably, the gaps are centered on the magnets at stroke center.

In one form of the invention the magnetic elements are permanent magnets. In another, moving iron form of the invention, the magnetic elements are polarized by a permanent magnet in the stator. The magnetic elements may be in annuluses surrounding piston cylinders or they may be parts of annular pistons.

Tapers in one or more of the flux paths adjacent to each magnet tend to draw each magnet to the location of minimum reluctance. Preferably, that location is at the center of the stroke of each magnet.

A cryogenic refrigerator according to the present invention includes a dual opposed piston compressor in which the pistons reciprocate in opposition to each other in a common cylinder. Radially polarized magnetic elements are fixed to the compressor pistons and reciprocate in respective annuluses about a flux return. There are two outer flux paths. A first flux path surrounds and extends between the annuluses and is surrounded by drive coils at opposite ends thereof. A second flux path surrounds the coils and extends between the two annuluses. Either the flux return or the first and second flux paths or both are tapered to center the stroke of the compressor pistons.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
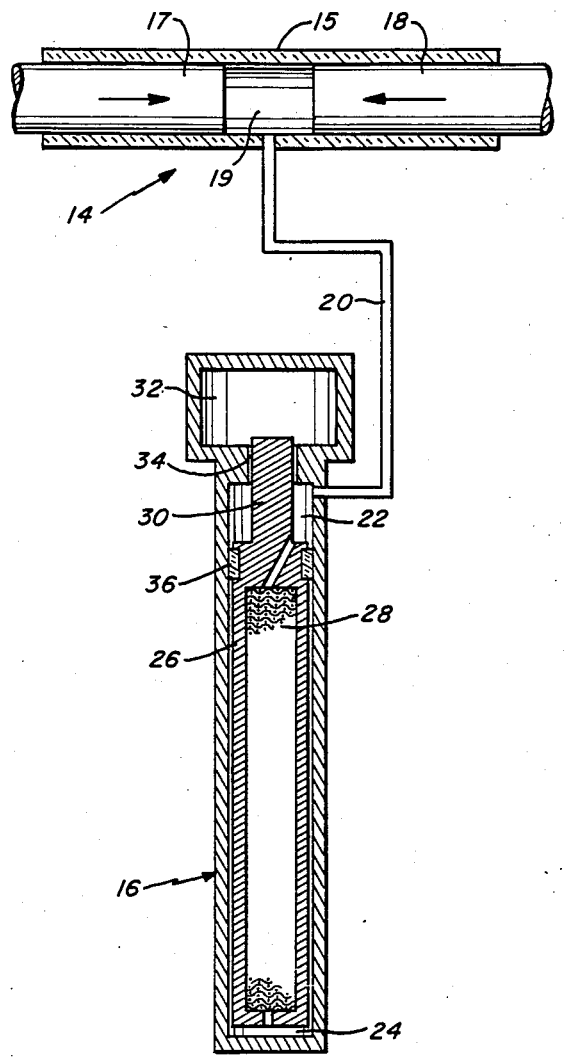
FIG. 1 illustrates operation of a prior art pneumatically driven split Stirling refrigerator with dual compressor pistons.
Figure 2:
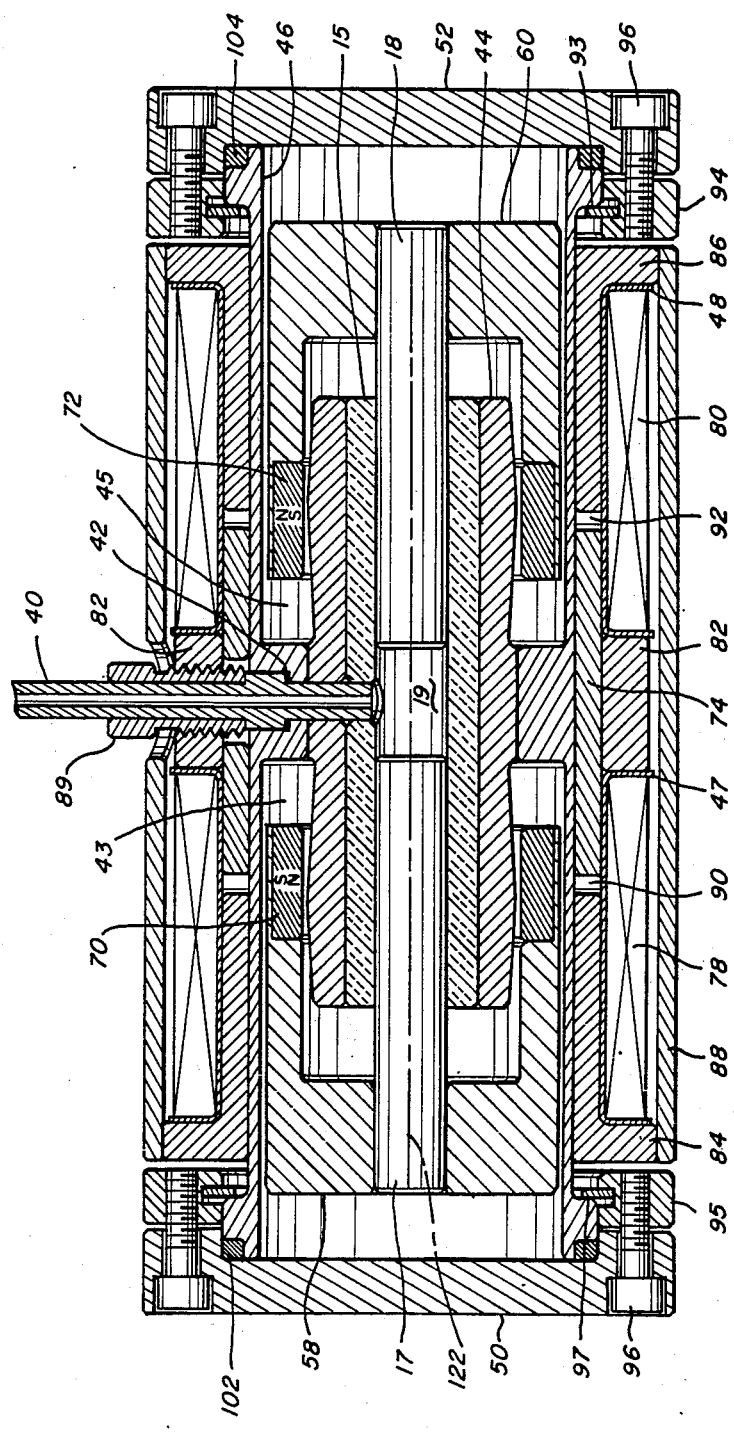
FIG. 2 is a longitudinal cross-sectional view of a dual piston compressor embodying the present invention.

The assembly and drive mechanism of a dual piston compressor of a split Stirling cryogenic refrigerator is illustrated in FIG. 2. Piston elements 17 and 18 reciprocate in a compressor cylinder 15 to compress and expand refrigerant such as helium gas in the head space 19. Both the piston elements and the compressor cylinder are made from hard material such as ceramic and are precisely machined to form narrow gaps in the order of micrometers such that clearance seals are formed along the lengths of the pistons within the cylinder. A generally cylindrical magnetic flux return element 44 surrounds the cylinder 15. The gas line 20 of FIG. 1 communicates with the head space 19 through a conduit pin 40 which extends through the cylinder 15 and flux return 44. The conduit 40 is sealed by a soft metal ring 42.

An hermetically sealed dead space is formed behind the piston elements 17, 18 and annuluses 43 and 45 by a housing 46 and left and right end covers 50, 52. Magnetic flux return element 44 is tubular in shape but is slotted along its entire length. Consequently, fill gas in space 43 is in communication with fill gas in space 45, and their pressures are kept equal.

A moving magnet armature assembly is fixed to each of the pistons 17, 18. Carriers 58, 60 are clamped or press fitted to the respective pistons. Radially polarized magnets 70, 72 are carried by the carriers 58, 60 in the annuluses 43, 45. The magnets are oppositely radially polarized. Thus, the magnet 70 is shown having a South pole about its outer circumference and a North pole about its inner circumference, and the magnet 72 is shown having North pole about its outer circumference and a South pole about its inner circumference. The magnets may be unitary rings or they may be formed by a plurality of circumferentially arranged magnet segments press fitted in place.

When driven by the electromagnetic drive to be described, the magnets 70, 72 reciprocate in opposition to each other within the annuluses 43, 45 and thus drive the pistons 17, 18 in opposition within the cylinder 15.

A first flux path surrounding the armatures is formed by sleeve 74 positioned about the housing 46. The sleeve 74 forms a single low reluctance path which, at each end, is adjacent to and surrounds a magnet 70, 72. Sleeve 74 may be constructed in two halves in order to permit assembly, like two halves of a clamshell. The first flux path of element 74 is surrounded by coils 78 and 80 spaced by a nonmagnetic spacer 82. A second flux path is formed by flanged rings 84 and 86 and an outer casing 88 of ferromagnetic material. Gaps 90 and 92 are maintained between the first and second flux paths. Rings 84 and 86 and outer casing 88 may be split, like clamshells, to permit assembly.

In assembly, the flux path rings 74, 84 and 86 and spacer 82 are positioned with the coils 78 and 80, wound upon respective insulating formers 47 and 48, on the housing 46. The flux path elements 74, 84, 86, and 88 may be split in order to be positioned about the housing 46 without interference. Spacer 82 has a press fit over the flux path 74 and the housing 46, and thus compresses the flux return element 44 to fit tightly upon the cylinder 15. As an alternative to the press fit of spacer 82, it may carry a single set screw with which to create clamping pressure upon the stack of inner elements 74, 46, and 44 in turn. The conduit pin 40 can be secured by an externally threaded nut 89 threaded through the spacer 82.

The armature assemblies can then be inserted through the open ends of the housings 46 and the end covers 50 and 52 can be positioned over the open ends. The ferromagnetic casing 88, comprising two half sleeves, can then be positioned over the entire unit. Flanges 94 and 95 are installed together with snap rings 93 and 97. Each flange 94, 95 carries a number of threaded holes allowing the end caps 50 and 52 to be assembled using a number of screws 96. Tightening of screws 96 cause gastight sealing by means of O-rings or indium seals 102 and 104.

It can be noted that the coils are positioned entirely outside of the helium gas environment. With that arrangement, there is no danger of contamination of the helium gas by organic materials used to construct the coils. Further, no electrical feedthroughs into the helium environment are required. With all coils outside of the helium enclosing housing, a compact, easily constructed assembly is provided and heat generated in the coils is easily removed.

Figure 3:
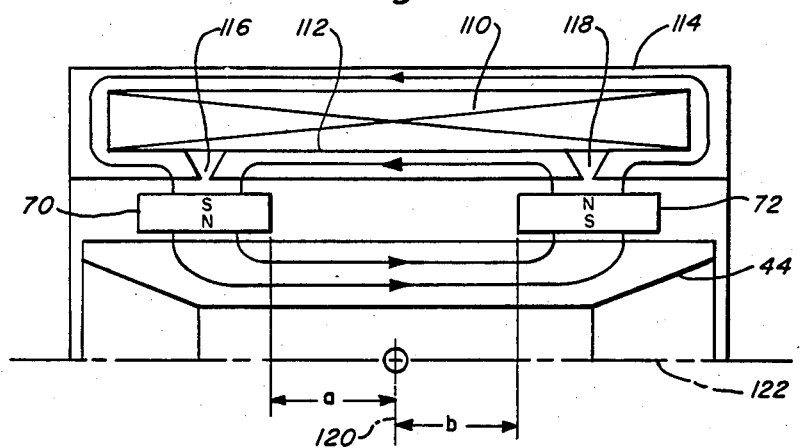
FIG. 3 is a schematic illustration of the magnetic circuit of the compressor of FIG. 2.
Figure 4:
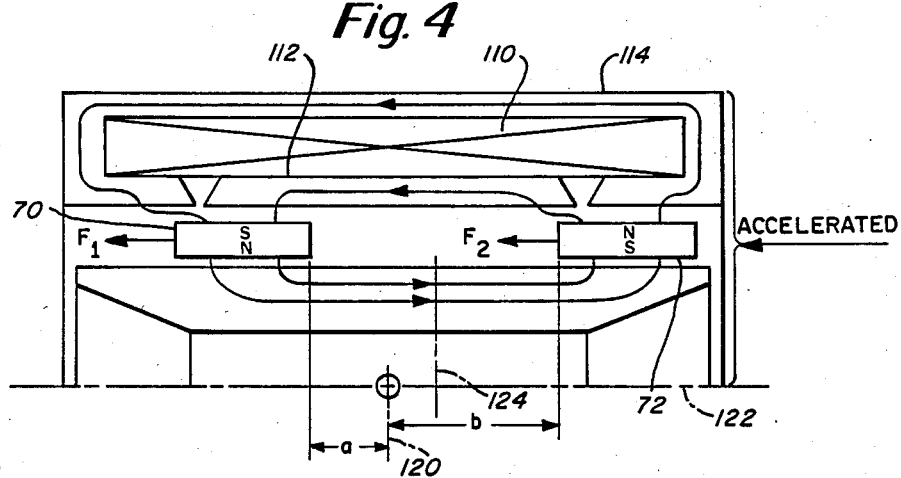
FIG. 4 is an illustration similar to FIG. 4 with the two permanent magnet assemblies shifted relative to the stator due to acceleration of the stator in a direction parallel with the center axis of the assembly.
Figure 5:
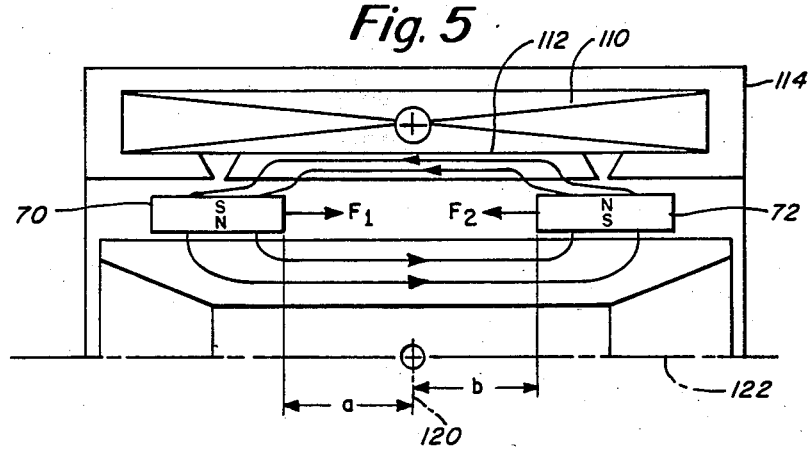
FIG. 5 is a schematic illustration similar to FIG. 4 illustrating the magnetic flux transfer when the coil is energized.

Interaction of the magnetic armatures is illustrated by FIGS. 3 through 5. Of the armatures, only the annular, radially polarized magnets 70 and 72 are shown. As in FIG. 2, these magnets surround a flux return sleeve 44. Each of the first and second flux paths 112 and 114 is shown as a single member. Further, the coils 78 and 80 are shown as a single coil 110, it being understood that the operation of the system is the same with single or multiple coils.

When no electric current is passed through the coil and the magnets 70 and 72 are centered at the gaps 116 and 118 between the first and second flux paths, the flux between the two magnets divides equally between the two outer flux paths and all flux is returned through the inner flux return 44. Magnetic coupling of magnet 70 to magnet 72 such that they tend always to move in equal and opposite directions will now be described. For example, if the magnet 72 is shifted toward the right without an opposing motion of magnet 70 to the left, a greater amount of flux of magnet 72 is directed through the second flux path 114 and a lesser amount through 112. This increases the flux density between the second flux path 114 and the inner flux return 44, while decreasing the flux density between flux path 112 and inner flux return 44. As a result, magnet 70 experiences forces tending to move it to the left. It therefore tends to move equally and oppositely to magnet 72. Also, the shift of magnet 72 to the right increases the flux density between flux return 44 and the second flux path 112 due to the decreased area across the gap between magnet 72 and flux path 112. That increased flux density tends to retard movement of the magnet 72 to the right, unless magnet 70 should move to the left.

It can be seen that this balancing of the two magnets about a centerline 120 is not restricted to situations in which the magnets are centered at the gaps 116 and 118. For example, if both magnets become shifted away from the centerline 120 together, the flux would be transferred to the outer second flux path but the flux density at each magnet would be maintained uniform. Therefore, there would be no magnetic pull on either of the magnets. Similarly, both magnets could shift toward the centerline 120 together while maintaining uniform flux density and thus avoiding the magnetic pull which occurs with unbalanced magnets. In general, for small forces pulling one or both of the magnets relative to the stator other than in balanced opposition, the magnets tend to move in opposition such that the distances a and b of the inner ends of the magnets to the center line 120 are equal.

FIG. 4 illustrates the reaction of the magnetic opposition coupling to an external acceleration applied to the entire compressor. The acceleration to the left displaces both pistons to the right relative to the stator such that distance a no longer equals distance b. However, in so doing the flux density increases to the left of each magnet creating restoring forces $F_1$ and $F_2$ sufficient to resist the acceleration. Although the large force resulting from the acceleration may be sufficient to cause the center of gravity of the two armatures to move somewhat from the centerline 120, the magnet rings are still constrained to move in exact opposition relative to their shifted center of gravity 124.

FIG. 5 illustrates the effect of current through the coil. With current flowing into the page as viewed in FIG. 5, the coil sets up a control magnetic flux which is in opposition to the polarization flux of the permanent magnets in the second flux path 114 and which reinforces the flux of the permanent magnets in the first flux path 112. This increases the flux density between each of the permanent magnets and the first flux path 112 and thus draws those permanent magnets toward the centerline 120. Similarly, if the current in the coil is reversed, the control flux reinforces the polarization flux in the second flux path 114 and is in opposition to the polarization flux in the first flux path 112. The magnets are then caused to move outward away from the centerline 120 to reduce the flux density between the magnets and the second flux path 114.

It will be recognized that for proper balanced operation of the system, the magnets 70, 72 should at all times be adjacent to the gaps 116, 118. To that end, the lengths of the magnets parallel to the axial centerline 122 should be at least as great as their stroke length.

Other considerations for designing suitable electromagnetic elements for a particular application can be noted. The stroke length should be about equal to the magnet ring inner radius in order to avoid saturation of the inner flux return. Otherwise, the magnet ring should be made circumferentially discontinuous, that is separated into individual segments about the circumference. The iron circuit should everywhere have about the same cross section normal to the flux, approaching in operation but not exceeding the saturation flux density in order to minimize weight. To that end, for each of the first and second flux paths and the flux return 44, the product of the average radius and the difference in maximum and minimum radii should be about the same.

The magnetic balancing using two flux paths described above minimizes the effects of linear accelerations along the machine axis. Movement of the armatures due to linear accelerations along the two radial axes are mechanically restrained by the linear bearing of the pistons within the cylinders. The magnetic balancing does not restrain the two armatures from movement in opposite directions due to angular velocity or acceleration about the axis 120. This is because such an acceleration drives the two armatures outward together and uniform flux density between the two magnets is maintained. Such contramode motion of the pistons is also caused by a steady offset pressure across each piston such as caused by check valving past the clearance seals. During operation of the refrigerator, gas leakage tends to be greater from the head space 19 to dead spaces 43, 45 at the opposite ends of the pistons. The increased pressure in the dead space tends to move each piston inwardly away from its desired mean position.

Contramode movement due to angular velocity or acceleration or due to pressure differentials is resisted in the system of FIG. 2 by means of tapering of the flux return 44 to points opposite the gaps 90, 92. The magnets 70 and 72 tend to move to the axially centered positions at which the radial gaps between the flux return 44 and the magnets 70, 72 are minimized and at which the magnetic reluctance for the polarization flux is thus minimized. An angle of only a few degrees from a line parallel with the axial center line 122 is sufficient for stabilizing the location of a cryogenic compressor piston when check valving is present.

Figure 6:
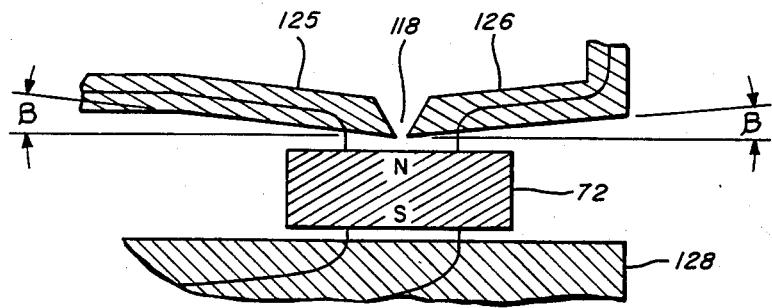
FIG. 6 is a schematic illustration of tapered outer flux paths for centering of the armature.

As an alternative to the centering approach in which the center flux return is tapered, the approach of FIG. 6 may be used. Here, each of the first and second flux returns 125 and 126 is conically tapered toward each of the magnets 70, 72 to minimize the reluctance between the magnets and those flux paths at the gaps 116, 118. The flux return 128 may be straight in section as shown in FIG. 6 or may itself be tapered.

Figure 7:
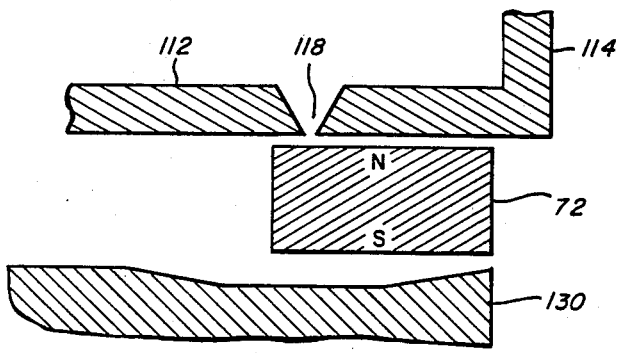
FIG. 7 is an illustration of tapering of the center flux return for positioning the armature at opposite ends of its stroke.

FIG. 7 illustrates tapering of flux return 130 so that the magnets 70, 72 seek the end positions of the armature stroke. Here, the flux return 130 falls away from the magnets across from the gaps 116, 118 at the stroke center. Taper of this kind tends to decenter the magnet rings. Such taper may be useful to reduce the drive power of the compressor since the magnetic forces tend to oppose the gas forces throughout the stroke.

Figure 8:
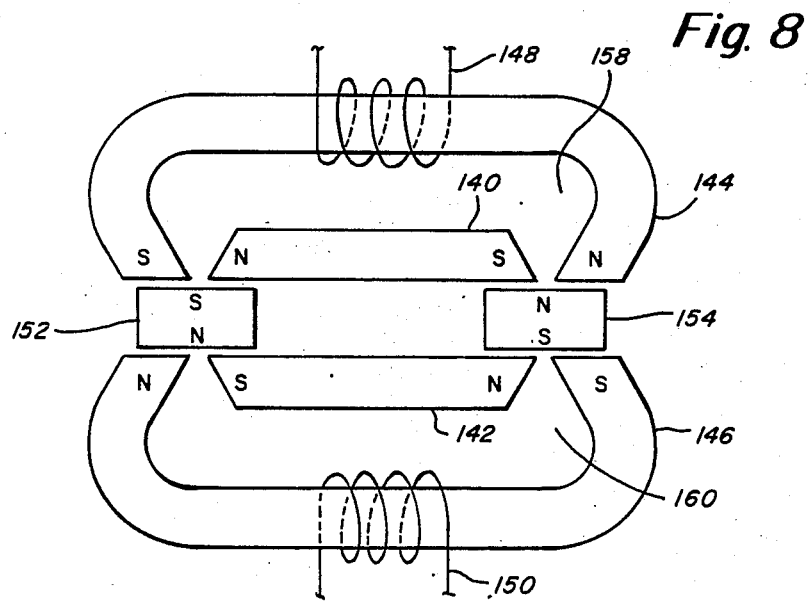
FIG. 8 is an alternative flat assembly of an electromagnetic motor or generator.

FIG. 8 illustrates an alternative flat embodiment of the invention which does not have cylindrical parts. As with the arrangement of FIG. 2, the electromagnetic machine of FIG. 8 may serve as either a motor or a generator. As a motor, current through coils drives a permanent magnet armature, and as a generator movement of the permanent magnet armature generates current through the coils. FIG. 8 shows a pair of first flux paths 140, 142 and a pair of second flux paths 144 and 146. Coils 148 and 150 are wrapped about each of the second flux paths 144 and 146. Current through the coils 148 and 150 creates flux which opposes or reinforces flux through the first paths and oppositely reinforces or opposes the flux in the second paths. The resultant increase in flux density between the magnets and one of the flux paths causes movement of the magnets 152, 154. As with the embodiment of FIG. 2, the nonuniformity in flux density resulting from one magnet moving alone or in the same direction as the other magnet results in magnetic forces which tend to move the magnets equal and opposite distances.

Yet another embodiment of the invention can be realized by designing an annular machine defined by the flux paths of FIG. 8 rotated about an axis 156. Separate coils would be wound in the resultant annuluses 158 and 160.

Figure 9:
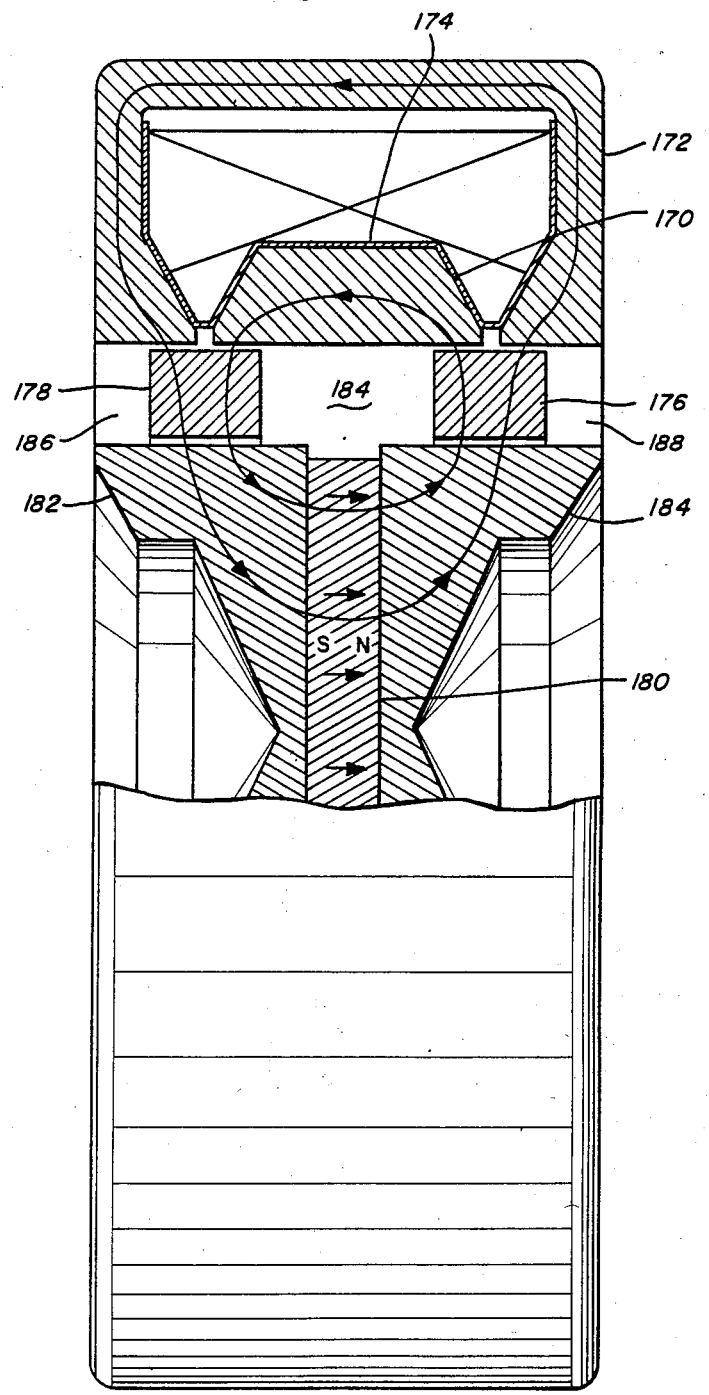
FIG. 9 is an alternative moving iron embodiment of the invention.

FIG. 9 illustrates an alternative, moving iron embodiment of the invention. As in previous embodiments, the electromagnetic machine includes first and second flux paths 170 and 172 with a coil 174 there between. In this embodiment, however, the armature magnetic elements 176 and 178 are not permanent magnets. Rather, they are radially and oppositely polarized by a permanent magnet 180 sandwiched between flux return elements 182 and 184 in a central portion of the stator. Otherwise, it can be seen that the machine of FIG. 9 operates in a fashion much the same as that of FIG. 1. Movement of one of the annular magnetic elements 176, 178 results in a shift in the flux between the two parallel flux paths 170 and 172. If such movement is not offset by an equal and opposite movement by the other magnetic element, a non-uniform flux density between the magnetic elements and the parallel flux paths results. That nonuniform flux density causes equalizing forces to be applied to the two magnetic elements.

A further difference between the machines of FIGS. 1 and 9 is that the magnetic elements 176, 178 of the FIG. 9 machine serve as annular pistons. The annulus 184 between the annular piston elements serves as a compressor head space. Because there is no need to provide a connection between the magnetic elements and a separate compressor piston, the end spaces 186 and 188 can also serve as compression spaces which provide pressure waves 180 degrees out of phase from the pressure wave in the space 184. Alternatively, the separate centered piston element shown in FIG. 1 could be utilized with the moving iron embodiment of FIG. 9.

The embodiment of FIG. 9 has the advantage of a lesser moving mass. As a result, the machine can operate at higher frequencies and thus handle greater amounts of gas with a given size motor. The moving magnet system, on the other hand, has the advantages of lesser radial forces and a more efficient magnetic circuit. Further, the centered piston arrangement in which the piston is separate from the magnetic elements simplifies the problem of providing the dynamic sealing between the piston and the cylinder.

While the invention has been particularly shown and described with reference to preferred embodiments thereof, it will be understood by those skilled in the art that various changes in form and details may be made therein without departing from the spirit and scope of the invention as defined by the appended claims.

I claim:

1. An electromagnetic machine comprising:
    a pair of armatures mounted for reciprocal movement toward and away from each other; and
    a stator having parallel magnetic flux paths between the armatures and oriented relative to the armatures such that movement of an armature transfers flux between the flux paths and such transfer of flux with movement of one armature not balanced by movement of the other armature in an opposite direction causes balancing magnetic forces between the armatures such that they tend to move equally and oppositely.

2. An electromagnetic machine as claimed in claim 1 wherein each armature comprises a radially polarized magnetic element, the magnetic elements being polarized opposite to each other.

3. An electromagnetic machine as claimed in claim 2 wherein the magnetic elements of the armature are permanent magnets.

4. An electromagnetic machine as claimed in claim 1 wherein a flux path is tapered relative to each of the armatures to provide locations of minimum reluctance within the strokes of the armatures.

5. An electromagnetic machine comprising:
    a pair of radially polarized magnetic elements mounted for reciprocal movement toward and away from each other, the magnetic elements being polarized opposite to each other;
    first and second magnetic flux paths, portions of each flux path surrounding each magnetic element and there being a gap between the flux paths adjacent to each magnetic element; and
    electromagnetic coil means surrounding the first flux path and surrounded by substantial portions of the second flux path.

6. An electromagnetic machine as claimed in claim 5 wherein the magnetic elements are permanent magnets.

7. An electromagnetic machine as claimed in claim 6 wherein each magnetic element is fixed to a piston which is within a cylinder and each magnetic element reciprocates in an annulus about the piston cylinder.

8. An electromagnetic machine as claimed in claim 5 wherein each magnetic element reciprocates in an annulus and is polarized by a permanent magnet fixed relative to the electromagnetic coil and positioned within the annulus.

9. An electromagnetic machine as claimed in claim 8 wherein the magnetic element is part of an annular piston.

10. An electromagnetic machine as claimed in claim 5 wherein the magnetic element is part of an annular piston.

11. An electromagnetic machine as claimed in claim 5 wherein each magnetic element is fixed to a piston which is within a cylinder and each magnetic element reciprocates in an annulus about the piston cylinder.

12. An electromagnetic machine as claimed in claim 11 further comprising a flux return positioned about the piston cylinder and positioned at each end thereof within each annulus.

13. An electromagnetic machine as claimed in claim 12 wherein a flux path is tapered to provide locations of minimum reluctance within the strokes of the magnetic elements.

14. An electromagnetic machine as claimed in claim 5 where a flux path is tapered to provide a location of minimum reluctance within the stroke of each magnetic element.

15. An electromagnetic machine as claimed in claim 5 wherein each magnetic element is continuous along a length greater than the stroke length of the piston and a gap between the first and second flux paths is centered on the magnetic element at stroke center.

16. An electromagnetic machine as claimed in claim 5 wherein the coil means comprises separate coils surrounding each magnetic element.

17. An electromagnetic machine as claimed in claim 1 comprising:
    a pair of radially polarized magnetic elements counted for reciprocal movement toward and away from each other, the magnetic elements being polarized opposite to each other;
    first and second magnetic flux paths, portions of each flux path surrounding each magnetic element and there being a gap between the flux paths adjacent to each magnetic element; and
    electromagnetic coil means surrounding the first flux path and surrounded by substantial portions of the second flux path.

18. An electromagnetic machine as claimed in claim 17 wherein the magnetic elements are permanent magnets.

19. An electromagnetic machine as claimed in claim 18 wherein each magnetic element is fixed to a piston which is within a cylinder and each magnetic element reciprocates in an annulus about the piston cylinder.

20. An electromagnetic machine as claimed in claim 17 wherein each magnetic element reciprocates in an annulus and is polarized by a permanent magnet fixed relative to the electromagnetic coil and positioned within the annulus.

21. An electromagnetic machine as claimed in claim 20 wherein the magnetic element is part of an annular piston.

22. An electromagnetic machine as claimed in claim 17 wherein the magnetic element is part of an annular piston.

23. An electromagnetic machine as claimed in claim 17 wherein each magnetic element is fixed to a piston which is within a cylinder and each magnetic element reciprocates in an annulus about the piston cylinder.

24. An electromagnetic machine as claimed in claim 23 further comprising a flux return positioned about the piston cylinder and positioned at each end thereof within each annulus.

25. An electromagnetic machine as claimed in claim 24 wherein a flux path is tapered to provide locations of minimum reluctance within the strokes of the magnetic elements.

26. An electromagnetic machine as claimed in claim 17 where a flux path is tapered to provide a location of minimum reluctance within the stroke of each magnetic element.

27. An electromagnetic machine as claimed in claim 17 wherein each magnetic element is continuous along a length greater than the stroke length of the piston and a gap between the first and second flux paths is centered on the magnetic element at stroke center.

28. An electromagnetic machine as claimed in claim 17 wherein the coil means comprises separate coils surrounding each magnetic element.

* * * * *